United States Patent [19]

Williams et al.

[11] Patent Number: 4,514,271

[45] Date of Patent: Apr. 30, 1985

[54] STABLE DISPERSION OF ALKYLATED POLYVINYLPYRROLIDONE AND VINYL PYRROLIDONE

[75] Inventors: Earl P. Williams, Pen Argyl, Pa.; Lindley S. Wood, Montclair, N.J.

[73] Assignee: GAF Corporation, Wayne, N.J.

[21] Appl. No.: 496,789

[22] Filed: May 23, 1983

Related U.S. Application Data

[63] Continuation-in-part of Ser. No. 280,032, Jul. 2, 1981, abandoned.

[51] Int. Cl.³ .................... C08F 2/50; C08F 271/02
[52] U.S. Cl. ........................ 204/159.15; 427/54.1; 525/283
[58] Field of Search ............... 204/159.15; 525/283

[56] References Cited

U.S. PATENT DOCUMENTS

| | | | |
|---|---|---|---|
| 3,417,054 | 12/1968 | Merijan et al. | 260/66 |
| 3,423,381 | 1/1969 | Merijan et al. | 260/88.1 |
| 3,721,617 | 3/1973 | Watt | 204/159.11 |
| 3,816,281 | 6/1974 | Feinberg | 204/159.18 |
| 4,169,167 | 9/1979 | McDowell | 204/159.15 |
| 4,229,274 | 10/1980 | Carlblom | 204/159.15 |

OTHER PUBLICATIONS

"Ganex V516 Polymer", GAF Corp., 1980, 2 page Product Literature.
1979, GAF Chemical Catalog, p. 3.

*Primary Examiner*—John C. Bleutge
*Assistant Examiner*—A. H. Koeckert
*Attorney, Agent, or Firm*—Joshua J. Ward; J. Gary Mohr; Marilyn J. Maue

[57] ABSTRACT

Composition consisting essentially of:
a. Poly (alkylated vinylpyrrolidone) which is a linear copolymer of:
  1. alpha olefin having at least two carbon atoms; and
  2. N vinyl monomer of the formula

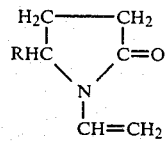

where R represents H, $CH_3$ or $C_2H_5$; and
b. N-vinyl-2-pyrrolidone as diluent monomer, the N-vinyl-2-pyrrolidone being present in an amount between about 25 and about 30 wt % based on the total of N-vinyl-2-pyrrolidone and poly (alkylated vinylpyrrolidone).

11 Claims, No Drawings

STABLE DISPERSION OF ALKYLATED POLYVINYLPYRROLIDONE AND VINYL PYRROLIDONE

RELATED APPLICATION

This application is a continuation-in-part of our co-pending application Ser. No. 280,032 filed July 2, 1981, now abandoned.

BACKGROUND OF THE INVENTION

This invention relates to an alkylated polyvinylpyrrolidone composition and more particularly to an alkylated polyvinylpyrrolidone/vinylpyrrolidone dispersion.

Alkylated vinylpyrrolidones of the type disclosed in U.S. Pat. Nos. 3,423,381 and 3,417,054 have found wide applications including for example, use in pigment dispersion applications, solubilizers for dyes, in cosmetic and toiletries as emollients and as additives in film forming resins. Other applications have included petroleum additives, as sludge and detergent dispersant, viscosity index improvers and pour point depressants.

Poly(alkylated vinylpyrrolidone) products are sold under the registered trademark GANEX, by GAF Corporation and range from liquids to waxy and granular solids. They are soluble in mineral oil, organic solvents and other polymers. As a 100% material, however, they may become tacky solids and consequently are difficult to handle.

SUMMARY OF THE INVENTION

It has now been found that poly(alkylated vinylpyrrolidone) has a narrow range of compatibility with vinylpyrrolidone, but in that narrow range, can form dispersions which are easy to handle, stable when stored away from light and function favorably as curing aids for high solids radiation cured coating compositions.

Accordingly the invention includes a composition consisting essentially of:
a. Poly(alkylated vinylpyrrolidone) which is a linear copolymer of:
  1. alpha olefin having at least two carbon atoms; and
  2. N vinyl monomer of the formula

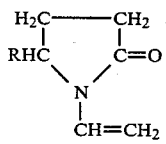

where R represents H, $CH_3$ or $C_2H_5$.
b. N-vinyl-2-pyrrolidone as diluent monomer, the N-vinyl-2-pyrrolidone being present in an amount between about 25 and about 30 wt % based on the total of N-vinyl-2-pyrrolidone and poly(alkylated vinylpyrrolidone).

The invention also includes the method of forming a radiation cured coating which comprises:
a. forming composition of the invention;
b. mixing a minor amount of said composition as a dispersion aid with a multi-component radiation curable coating composition having as a component of said composition N-vinyl-2-pyrrolidone;
c. forming said coating composition into an uncured coating; and
d. subjecting said coating to radiation to produce a cured coating.

DETAILED DESCRIPTION OF THE INVENTION

Poly(alkylated vinylpyrrolidones) used in the present invention and their manufacture are more fully described in U.S. Pat. Nos. 3,423,381 and 3,417,054, the subject matter of which is incorporated herein by reference. As described in these patents such poly(alkylated vinylpyrrolidones) may be made from heterocyclic N-vinyl monomers which are simultaneously copolymerized and alkylated with alpha olefins having at least two carbon atoms.

The heterocyclic N-vinyl monomers which are simultaneously copolymerized and alkylated with alpha olefins are characterized by the following formula:

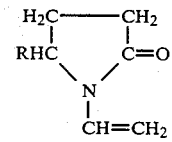

wherein R is selected from the group consisting of hydrogen, methyl, and ethyl. Such monomers include N-vinyl-2-pyrrolidone, N-vinyl-5-methyl pyrrolidone and N-vinyl-5-ethyl pyrrolidone.

Any alpha olefin having a molecular weight from about 28 to as high as 2500 may be employed as the co-monomer and in the alkylation of the active site in the moieties of the N-heterocyclic monomer during the simultaneous copolymerization and alkylation reaction. As examples of such alpha olefins the following are illustrative: ethene; propene; 1-butene; 1-pentene; 2-ethyl-1-butene; 2-methyl-1-pentene; 1-hexene; 5-methyl-1-hexene; 2-methyl-1-pentene; 1-hexene; 5-methyl-1-hexene; 2-methyl-1-pentene; 3-ethyl-1-pentene; 1-heptene; 1-octene; 1-nonene; 2-ethyl-1-hexene; 1-decene; 1-dodecene; 1-tetradecene; 1-hexadecene; 1-heptadecene; 1-octadecene; 1-nonadecene; 1-eicosene; 1-docosene; 1-tetracosene; 1-pentacosene; trimerized-tetradecene and polybutenes of molecular weight of 400 to 2500. Mixtures of suitable alpha olefins may also be used. Alpha olefins having between 2 and about 20 carbon atoms are preferred.

While linear alpha olefins are preferred because of their commercial availability, numerous isomers of alpha olefins ranging from 1-pentene to 1-pentacosene as well as polybutenes may also be employed in the alkylation reaction. The only precaution required in such case is that the isomer contain an ethylenic unsaturation in the alpha position thereof.

The heterocyclic N-vinyl monomers are readily copolymerized and alkylated with the alpha olefins by treating one mole of such monomer with 0.05 to 10 moles of olefin in solution in an organic solvent common to the monomer and the olefin in the presence of 0.025 to 0.30 mole of an organic peroxide catalyst per mole of olefin at a temperature ranging from 80° to 200° C. for a period of time ranging from 3 to 60 hours. The resulting solution of copolymerized and alkylated copolymer may be employed as such or, if desired, the organic solvent may be removed by vacuum distillation. Removal of alcohol solvent may for instance be desired where compositions of the invention are to be used in coatings such as urethane or epoxy cured systems where foreign hydroxyl containing materials are not desired. The solubility of the resulting copolymer in polar solvents decreases and the solubility in non-polar solvents increases as the molar ratio of alpha olefin to heterocyclic N-vinyl monomer increases. In other words, alkylated copolymers are obtained in which some or all of the heterocyclic N-vinyl moieties contain one or more alkyl groups of from at least 2 carbon atoms to as many carbon atoms as is contained in the olefin employed in the reaction.

In carrying out the simultaneous copolymerization and alkylation reaction, an organic solvent is employed which is common to the alpha olefin and the heterocyclic N-vinyl monomer. As solvents, various alcohols, such as methanol, ethanol, propanol, isopropanol, butanol, sec-butanol, amyl alcohol, hexanol, 2-ethyl-1-hexanol, ethylene glycol, 1,2-butanediol, 4-butanediol, etc., may be employed. Other solvents such as diethylene glycol, ethylene glycol monomethyl ether and the like may also be employed. It is to be noted that the nature or character of the organic solvent is immaterial so long as it forms a solution with the heterocyclic N-vinyl monomer and alpha olefins and is relatively inert toward alkylation. It is preferred however, that the solvent function as a hydrogen transfer agent.

The amount of inert organic solvent employed is not critical. Any amount which will yield a solution of the heterocyclic N-vinyl monomer and alpha olefin will suffice. For every part by weight of heterocyclic N-vinyl monomer, from two to ten parts of organic solvent, either by volume or by weight, are normally sufficient to yield a workable solution.

As peroxide catalysts (initiator) for the polymerization and alkylation reaction, any one of the known tertiary-alkyl organic peroxides and hydroperoxides such as, for example, di-t-butyl peroxide, t-butyl perbenzoate, di-t-butyl perphthalate, t-butyl-pentamethyl-ethyl peroxide, t-butyl-triphenylmethyl peroxide, di-t-amyl peroxide, bis-(triethylmethyl)peroxide, bis-(triphenylmethyl)peroxide, 2,5-dimethylhexyl-2,5-dihydroperoxide, 2,5-dimethyl-2,5-di(t-butyl peroxy)hexane, 2,5-dimethylhexyl-2,5-di(peroxy benzoate), t-butyl hydroperoxide, para-menthane hydroperoxide and the like may be used.

Stable compositions of the invention consist essentially of poly(alkylated vinylpyrrolidone) of the type described above with N-vinyl-2-pyrrolidone as diluent monomer. To obtain a composition containing significant amounts, eg at least about 5 wt %, of each of these ingredients and having satisfactory viscosity and compatibility, the N-vinyl-2-pyrrolidone must be present in amounts between about 25 and about 30 wt % based on the total of N-vinyl-2-pyrrolidone and poly(alkylated vinylpyrrolidone). Larger amounts of vinylpyrrolidone result in compositions which display clear signs of incompatibility while smaller amounts of vinylpyrrolidone result in compositions which are too viscous. Restricting vinylpyrrolidone content to between about 25 and about 30% results in a composition which flows readily at room temperature and which exhibits good compatibility between the vinylpyrrolidone and poly(alkylated vinylpyrrolidone). In forming compositions of the invention it is important that active catalyst residue be kept to a minimum and preferably completely decomposed to avoid polymerization of vinylpyrrolidone monomer.

In order to demonstrate the criticality of the proportions of ingredients required for compositions of the invention, mixtures of poly(alkylated vinylpyrrolidone) and N-vinyl-2-pyrrolidone monomer were prepared using various proportions of ingredients as shown in Table I. The poly(alkylated polyvinylpyrrolidone) used was a linear copolymer of N-vinyl-2-pyrrolidone and hexadecene in a molar ratio of 1.0:0.5, having a molecular weight of about 9,500 and available from GAF Corporation under the tradename GANEX®V516. Polymers of this type are more fully described in U.S. Pat. No. 3,423,381. Fifty grams of each of the compositions referred to in Table I were made up by rotation on a mixing wheel for from 5 to 72 hours, as required, followed by heating on a steam bath if difficult to disperse. After mixing, each sample was allowed to stand for 24 hours before observations were taken. The N-vinylpyrrolidone used was caustic stabilized commercial grade.

TABLE I

Mixtures of GANEX V516 and N—vinyl-2-pyrrolidone

| Composition No. | wt % GANEX V516 | wt % N—vinyl-2-pyrrolidone | Appearance and flowability at room temperature |
|---|---|---|---|
| 1 | 1 | 99 | hazy, stable |
| 2 | 2 | 98 | very hazy, stable |
| 3 | 3 | 97 | cloudy, stable |
| 4 | 4 | 96 | cloudy, faint separation |
| 5 | 5 | 95 | cloudy, slight separation |
| 6 | 10 | 90 | cloudy, slight separation |
| 7 | 20 | 80 | cloudy, separated |
| 8 | 30 | 70 | cloudy, separated |
| 9 | 40 | 60 | cloudy, separated |
| 10 | 50 | 50 | cloudy, separated |
| 11 | 60 | 40 | cloudy, separated |
| 12 | 70 | 30 | hazy, stable |
| 12a | 70 | 30 | almost clear, stable, flowed readily |
| 13 | 75 | 25 | slight haze, stable, flowed readily |
| 14 | 80 | 20 | faint haze, stable, barely flowed |
| 15 | 90 | 10 | almost clear, did not flow |

The data presented in Table I shows that a narrow composition range of mutual compatibility and significant viscosity reduction exists in the ratio 70–75% poly(alkylated vinylpyrrolidone) to 30–25% vinylpyrrolidone. At higher poly(alkylated vinylpyrrolidone) levels compatibility is excellent, however, viscosity is such that at room temperature (25° C.) the products either flow very slowly or not at all. At poly(alkylated vinylpyrrolidone) levels below 70%, the compatibility decreases rapidly.

While unstabilized compositions of the invention are useful for the various applications mentioned above, such unstabilized compositions deteriorate in a short time upon exposure to light. It is therefore preferred that compositions of the invention be stabilized where substantial exposure to light is contemplated. Suitable stabilizers include sodium hydroxide in an amount between about 0.005 and about 0.1 wt % and N, N' di-sec-butyl paraphenylenediamine in amounts between about 50 and about 1000 ppm.

Compositions of the invention are useful in radiation curable coatings, especially coatings containing N-vinylpyrrolidone. In such coatings the poly(alkylated vinylpyrrolidone) functions as a dispersing aid in coatings eg of the type described in greater detail in our application Ser. No. 260,135, filed May 1, 1981 and now abandoned. Compositions of the invention can also be used in other radiation curable coating such as those described in U.S. Pat. Nos. 4,169,167 and 4,229,274, the disclosures of which are incorporated herein by reference. A preferred embodiment of the invention involves use of compositions of the invention in forming radiation curable coatings containing between about 1 and about 3 wt % composition of the invention and between about 4 and about 20 wt % N-vinyl-2-pyrrolidone in addition to the N-vinylpyrrolidone contained in the composition of the invention.

The following examples illustrated the invention without limiting the scope thereof.

EXAMPLE

Poly(alkylated vinylpyrrolidone) may be formed by reacting one mole of N-vinyl-2-pyrrolidone with 0.5 mole 1-hexadecene in isopropanol solvent and in the presence of 0.15 mole di-tert-butyl peroxide catalyst at a temperature of 130°–140° C. for 12–14 hours.

Following removal of alcohol by vacuum distillation the resulting poly(alkylated vinylpyrrolidone) may then be mixed with N-vinyl-2-pyrrolidone to form composition of the invention having a 70/30 ratio of poly(alkylated vinylpyrrolidone) to N-vinyl-2-pyrrolidone. This composition may then be mixed with the other ingredients listed below to form a UV curable coating having the following ingredients:

| Ingredient | Parts by Weight |
| --- | --- |
| Mixture of 75% poly (alkylated vinylpyrrolidone) and 25% N—vinyl-2-pyrrolidone | 2 |
| Diethylene glycol Adipate/Isophorone Diisocyanate/Hydroxyethyl Acrylate Oligomer | 59 |
| Phenoxyethyl Glycol adipate diol | 27 |
| Hexane diol diacrylate | 7.5 |
| N—vinyl-2-pyrrolidone | 4.5 |
| Benzophenone initiator | 3 |
| Silica gel of 4 micron average particle size and size range of 1–14 microns | 7 |
| Non-ionic silicone glycol polymer surfactant (Dow Corning Co. "DC-193") | 0.5 |
| Methoxyphenyl acetophenone photo initiator (Ciba Geigy "Irgacure 651") | 1 |

The thus formed radiation curable coating may then be coated onto a substrate and subjected to actinic light in a conventional manner to produce cured coating. Coating and curing methods as described in U.S. Pat. Nos. 4,169,167 and 4,229,274, the disclosures of which are incorporated herein by reference, are for instance suitable.

While the invention has been described above with respect to preferred embodiments thereof, it will be understood by those skilled in the art that various changes and modifications may be made without departing from the spirit and scope of the invention.

What is claimed is:

1. Composition consisting essentially of:
    a. Poly(alkylated vinylpyrrolidone) which is a linear copolymer of:
        1. alpha olefin having at least two carbon atoms; and
        2. N vinyl monomer of the formula

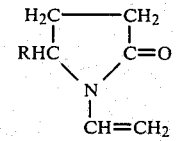

where R represents H, CH$_3$ and C$_2$H$_5$; and
    b. N-vinyl-2-pyrrolidone as diluent monomer, the N-vinyl-2-pyrrolidone being present in an amount between about 25 and about 30 wt % based on the total of N-vinyl-2-pyrrolidone and poly(alkylated vinylpyrrolidone).

2. Composition of claim 1 wherein the alpha olefin has from 2 to about 20 carbon atoms.

3. Composition of claim 2 wherein the alpha olefin is hexadecene.

4. Composition of claim 3 wherein the N-vinyl monomer is N-vinyl-2-pyrrolidone.

5. Composition of claim 4 which also contains between about 0.005 and about 0.1 NaOH stabilizer.

6. Method of forming a radiation cured coating which comprises:
    a. forming composition of claim 1;
    b. mixing a minor amount of said composition of claim 1 as a dispersion aid with a multi-component radiation curable coating composition having as a component N-vinyl-2-pyrrolidone;
    c. forming said radiation curable coating composition into an uncured coating; and
    d. subjecting said coating to radiation to produce a cured coating.

7. Composition of claim 1 wherein the alpha olefin has from 2 to about 20 carbon atoms and the poly(alkylated vinylpyrrolidone) has between about 0.05 and about 10 moles of olefin per mole of monomer.

8. Composition of claim 7 wherein the N-vinyl monomer is N-vinyl-2-pyrrolidone.

9. Composition of claim 8 wherein the alpha olefin is hexadecene.

10. Composition of claim 9 wherein the hexadecene is present in an amount of about 0.5 mole per mole of N-vinyl-2-pyrrolidone.

11. Method of forming a radiation cured coating which comprises:
    a. forming composition of claim 9;
    b. mixing a minor amount of said composition of claim 1 as a dispersion aid with a multi-component radiation curable coating composition having as a component N-vinyl-2-pyrrolidone;
    c. forming said radiation curable coating composition into an uncured coating; and
    d. subjecting said coating to radiation to produce a cured coating.

* * * * *